May 19, 1953  F. W. WINTERS  2,639,165
TRACTOR FRONT WHEEL SPRING SUSPENSION ASSEMBLY
Filed May 17, 1950  2 Sheets-Sheet 1
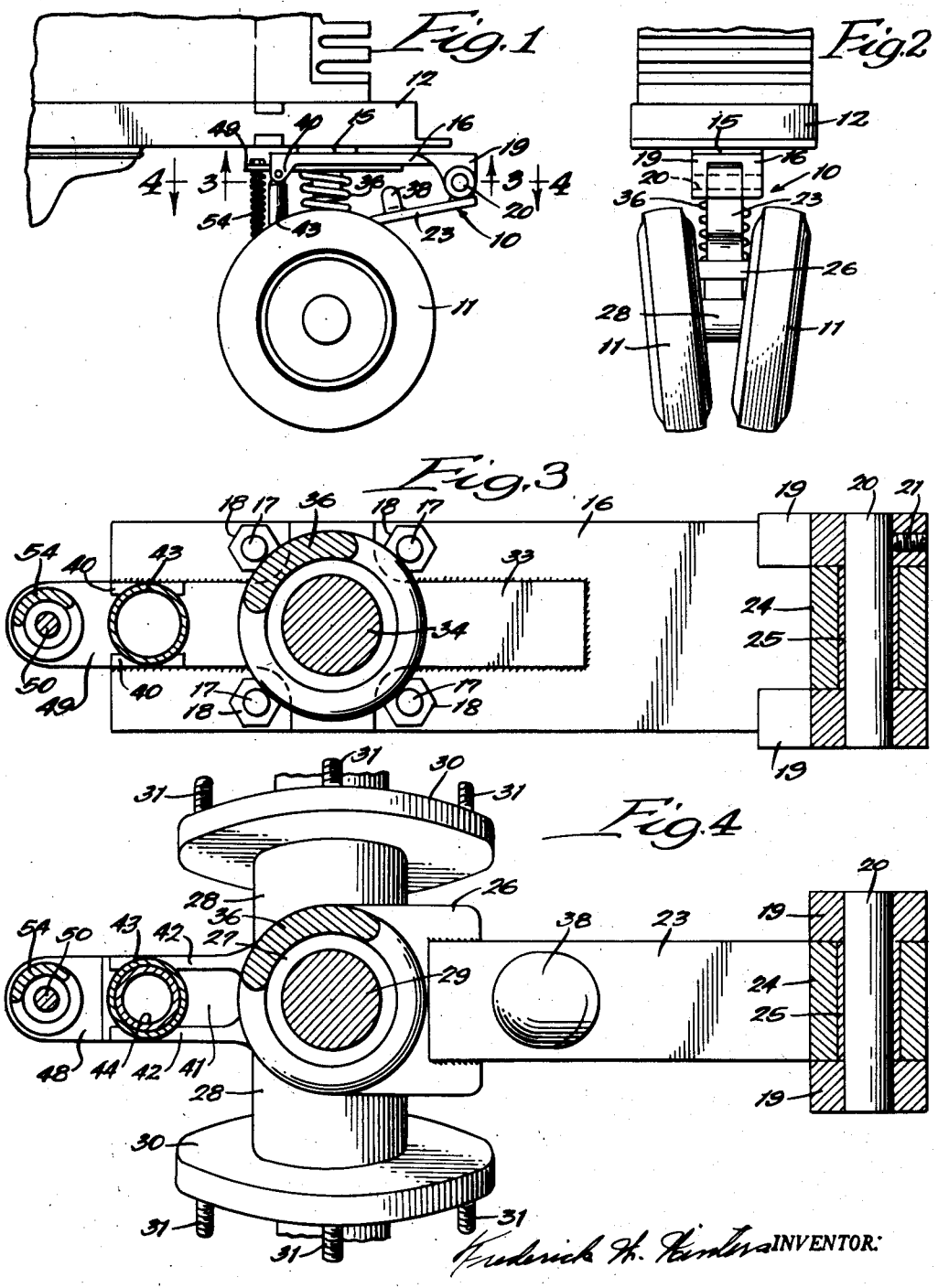
Frederick W. Winters INVENTOR.
BY Dawson Ooms Booth & Spangenberg
ATTORNEYS.

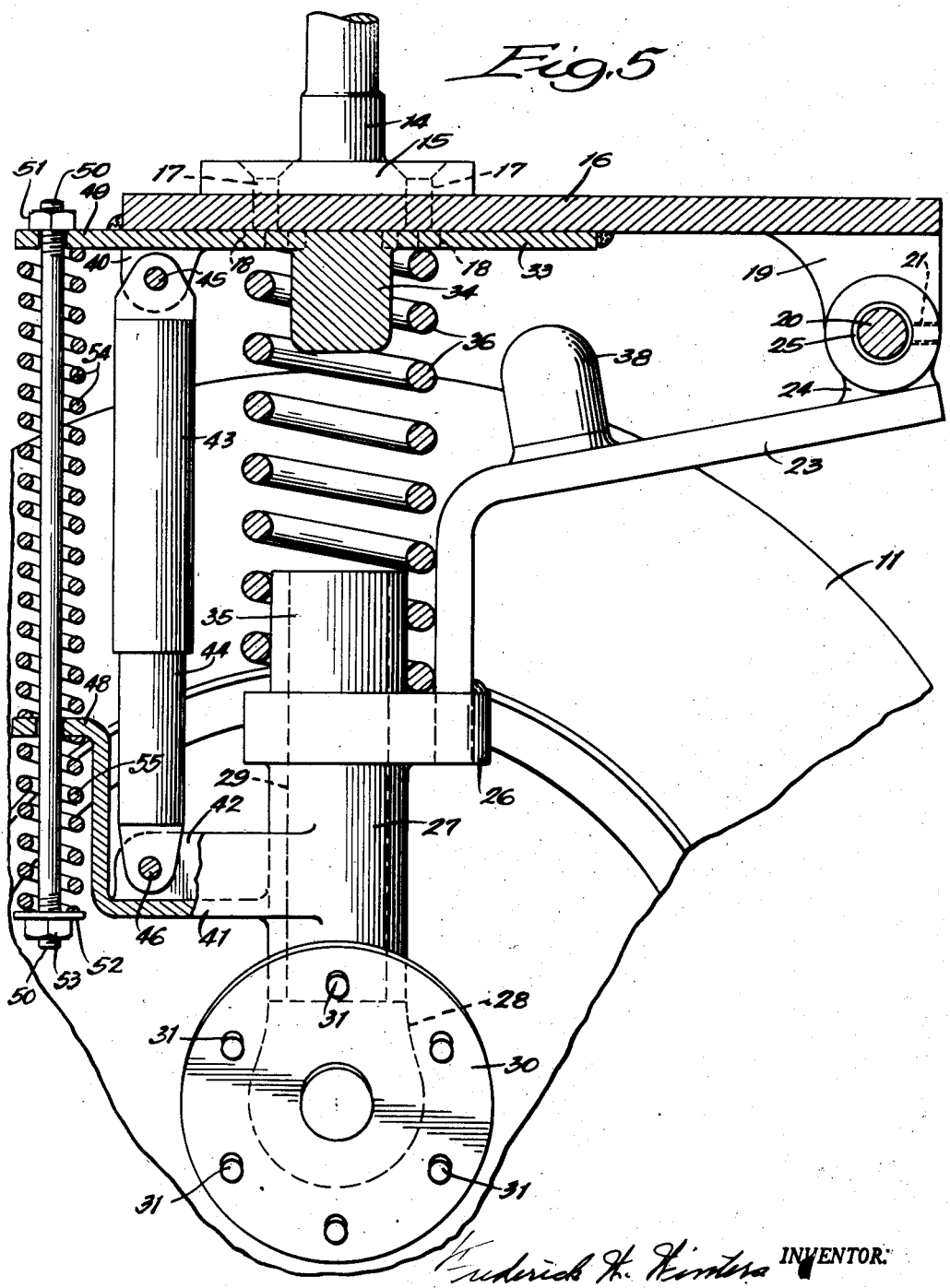

Patented May 19, 1953

2,639,165

UNITED STATES PATENT OFFICE 2,639,165

TRACTOR FRONT WHEEL SPRING SUSPENSION ASSEMBLY

Frederick W. Winters, Beaver, Wis.

Application May 17, 1950, Serial No. 162,409

3 Claims. (Cl. 280—87)

1

This invention relates to a front wheel spring suspension assembly for a tractor of the so-called three wheel type.

The principal object of this invention is to provide an improved front wheel spring suspension assembly for tractors which is simple in construction utilizing few movable parts, which maintains accurate alignment of the tractor front wheels and yet provides free spring suspension thereof, which is rugged in construction to withstand the rigors of farm work, which may be readily attached in the field to existing tractors, and which may be inexpensively manufactured.

The front wheel spring suspension assembly of this invention is adapted readily to be secured underneath the front of the tractor to the vertically arranged steering post thereof. It includes a supporting member attachable to the steering post and turnable about a vertical axis coincident with the axis of the steering post. A carrier member underlies the supporting member and is provided with wheel carrying means in substantial alignment with the vertical turning axis. Horizontally arranged pivot means offset forwardly from the vertical turning axis vertically pivots the carrier member to the supporting member. Spring means are interposed between the supporting member and the carrier member. This assembly effectively and simply spring suspends the front end of the tractor on the front wheels. Snubber means may be interposed between the supporting member and the carrier member to absorb shocks. Bumper means may also be interposed between the supporting and carrier members to limit the collapsing of these members. Further, resilient stop means may be provided to limit separation of the supporting and carrier members.

Further objects of this invention reside in the details of construction and the co-operative relationship between the component parts of the tractor front wheel spring suspension assembly.

Other objects and advantages of this invention will become apparent to those skilled in the art upon reference to the accompanying specification, claims and drawings.

Figure 1 is a side elevational view of the front end of a tractor with the front wheel spring suspension assembly of this invention applied thereto.

Fig. 2 is a front elevational view looking from the right in Fig. 1.

Fig. 3 is a horizontal sectional view taken substantially along the line 3—3 of Fig. 1.

2

Fig. 4 is a horizontal sectional view taken substantially along the line 4—4 of Fig. 1.

Fig. 5 is a vertical sectional view of the spring suspension assembly.

The spring suspension assembly of this invention is generally designated at 10 in Figs. 1 and 2, and it carries front wheels 11 for supporting the forward end of a tractor 12. The tractor may be of conventional construction of the so-called three wheel type. Such a tractor includes a vertically arranged steering post 14 provided with a bottom flange 15 as illustrated in Fig. 5.

The spring suspension assembly includes a supporting member 16 which is adapted to be secured to the flange 15 of the steering post 14 by means of bolts and nuts 17 and 18. The forward end of the supporting member 16 is provided with a pair of ears 19 for receiving a pivot pin 20, the pivot pin being held in place by means of a set screw 21.

The spring suspension assembly also includes a carrier member 23 which underlies the supporting member 16. The forward end of the carrier member 23 is provided with an ear 24 having a suitable bearing 25 for receiving the pivot pin 20. Thus the horizontally arranged pivot pin 20 pivotally mounts the carrier member 23 on the supporting member 16 for vertical pivotal movement. The rear end of the carrier member 23 is provided with a strap or bracket 26 which in turn carries a vertical sleeve 27, the parts being all integrally united. A wheel carrying member 28 is provided with a post 29 which is rigidly secured in the sleeve 27. The wheel carrying member 28 rotatably carries wheel disks 30 to which the wheels 11 may be secured by suitable bolts 31.

The supporting member 16 has a plate 33 rigidly secured thereto which in turn is provided with a boss 34 forming a spring seat which is in alignment with the steering post 14 and hence the vertical turning axis of the spring suspension assembly. The sleeve 27 also extends upwardly above the bracket 26 as illustrated at 35 and forms another spring seat which is in substantial alignment with the turning axis of the spring suspension assembly. Spring means in the form of a helical spring 36 is carried by the two spring seats so that the front end of the tractor is suspended by the spring 36. A suitable bumper 38 of rubber of the like may be utilized for limiting the collapsing of the carrier member 23 with respect to the supporting member 16.

The plate 33 is provided with a pair of depending ears 40. The sleeve 27 of the carrier member 23 is provided with an extension 41 also having a pair of ears 42. A snubber or shock absorber consisting of telescoping parts 43 and 44 is connected to the ears 40 by a pivot pin 45 and to the ears 42 by a pivot pin 46. The snubber thus interposed between the supporting member 16 and the carrier member 23 operates as a shock absorber.

The extension 41 is provided with an arm 48 having an aperture therein, and likewise the plate 33 is provided with an arm 49 having an aperture therein. A rod 50 extends through the apertures in the arms 48 and 49 and is provided at its upper end with a nut 51 and at its lower end with a washer 52 and nut 53. A spring 54 is interposed between the arms 48 and 49 and a spring 55 is interposed between the arm 48 and the washer 52. The rod 50 and spring 55 operate as a resilient stop for limiting separation of the carrier member 23 and the supporting member 16, and the spring 54 operates in conjunction with the spring 36 for providing the spring suspension for the tractor.

The wheel supporting means 28 is in substantial alignment with the steering post 14 and is maintained in that position by the horizontal pivot means which pivots together the carrier member 23 and the supporting member 16. Thus, upon turning of the steering post 14 the wheel supporting means 28 is correspondingly turned so that accurate steering of the tractor is obtained. Since the horizontal pivot means is offset forwardly from the steering post, twisting and bending of the parts is maintained at a minimum. Since the spring 36 is in substantial alignment with the steering post 14 and the wheel supporting means 28, the load of the tractor is substantially vertically carried and is not appreciably transmitted through the supporting member 16 and carrier member 23. The front end of the tractor is therefore effectively spring suspended by a simple mechanism utilizing few movable parts, which maintains accurate alignment of the tractor front wheels and yet provides free spring suspension and easy turning, and which is rugged in construction to withstand the rigors of farm work. The spring suspension assembly forms a compact unit which may be readily applied to a tractor in the field without the necessity of special tools and equipment. Being simple in construction, it may be inexpensively manufactured.

While for purposes of illustration one form of this invention has been disclosed, other forms thereof may become apparent to those skilled in the art and accordingly this invention is to be limited only by the scope of the appended claims.

I claim as my invention:

1. A front wheel spring suspension assembly for a farm tractor of the three wheel type having a vertically arranged steering post comprising, a supporting member adapted to be secured to the steering post underneath the tractor and turntable about a vertical axis coincident with the axis of the steering post, a carrier member underlying the supporting member and turntable therewith, horizontally arranged pivot means offset from the vertical turning axis for vertically pivoting the carrier member to the supporting member, wheel carrying means on the carrier member in alignment with the vertical turning axis for supporting a pair of front wheels for the tractor on opposite sides of the carrier member, a downwardly facing spring seat on the supporting member in alignment with the turning axis, an upwardly facing spring seat on the carrier member between the front wheels and in alignment with the turning axis, and a helical spring interposed between the two spring seats in alignment with the turning axis.

2. A front wheel spring suspension assembly for a farm tractor of the three wheel type having a vertically arranged steering post comprising, a supporting member adapted to be secured to the steering post underneath the tractor and turnable about a vertical axis coincident with the axis of the steering post, a carrier member underlying the supporting member and turnable therewith, horizontally arranged pivot means offset from the vertical turning axis for vertically pivoting the carrier member to the supporting member, wheel carrying means on the carrier member in alignment with the vertical turning axis for supporting a pair of front wheels for the tractor on opposite sides of the carrier member, a downwardly facing spring seat on the supporting member in alignment with the turning axis, an upwardly facing spring seat on the carrier member between the front wheels and in alignment with the turning axis, a helical spring interposed between the two spring seats in alignment with the turning axis, and snubber means offset from the turning axis and interposed between the supporting member and the carrier member.

3. A front wheel spring suspension assembly for a farm tractor of the three wheel type having a vertically arranged steering post comprising, a supporting member adapted to be secured to the steering post underneath the tractor and turnable about a vertical axis coincident with the axis of the steering post, a carrier member underlying the supporting member and turnable therewith, horizontally arranged pivot means offset from the vertical turning axis for vertically pivoting the carrier member to the supporting member, wheel carrying means on the carrier member in alignment with the vertical turning axis for supporting a pair of front wheels for the tractor on opposite sides of the carrier member, a downwardly facing spring seat on the supporting member in alignment with the turning axis, an upwardly facing spring seat on the carrier member between the front wheels and in alignment with the turning axis, a helical spring interposed between the two spring seats in alignment with the turning axis, and resilient stop means offset from the turning axis and interconnecting the supporting member and the carrier member for limiting separation thereof.

FREDERICK W. WINTERS.

References Cited in the file of this patent

UNITED STATES PATENTS

| Number | Name | Date |
|---|---|---|
| 819,302 | Munsing | May 1, 1906 |
| 1,006,518 | Annable | Oct. 24, 1911 |
| 1,177,237 | Egan | Mar. 28, 1916 |
| 1,422,671 | Cochran | July 11, 1922 |
| 2,123,087 | Leighton | July 5, 1938 |
| 2,525,506 | Wiedman | Oct. 10, 1950 |